US005703880A

United States Patent [19]
Miura

[11] Patent Number: 5,703,880
[45] Date of Patent: Dec. 30, 1997

[54] DATA COMMUNICATION METHOD FOR COMMUNICATING DATA HAVING DIFFERENT FRAME FORMATS AND FORMAT CONVERSION UNIT USED FOR SUCH A DATA COMMUNICATION METHOD

[75] Inventor: Kenji Miura, Nagoya, Japan

[73] Assignee: Fujitsu Limited, Kanagawa, Japan

[21] Appl. No.: 565,731

[22] Filed: Nov. 30, 1995

[30] Foreign Application Priority Data

May 8, 1995 [JP] Japan .................... 7-109323

[51] Int. Cl.⁶ .................... G06F 13/38; G06F 15/16
[52] U.S. Cl. .................... 370/465; 370/510; 364/DIG. 1; 364/DIG. 2
[58] Field of Search .................... 395/800, 200.15, 395/200.16, 200.11, 200.55, 200.54, 200.59, 200.78; 370/535, 514, 522, 176, 289, 466, 465, 470, 428, 510; 364/DIG. 1, DIG. 2; 340/825.79

[56] References Cited

U.S. PATENT DOCUMENTS

| | | |
|---|---|---|
| 4,882,727 | 11/1989 | Williams et al. .................... 370/465 |
| 4,979,169 | 12/1990 | Almond et al. .................... 370/466 |
| 5,467,347 | 11/1995 | Petersen .................... 340/825.79 |

*Primary Examiner*—Daniel H. Pan
*Attorney, Agent, or Firm*—Helfgott & Karas, P.C.

[57] ABSTRACT

A data communication method enables communications between terminals adapted to handle frame structure data having different formats. The terminals are connected via an asynchronous transfer mode (ATM) network in which frame structure data is transmitted in a form of an ATM cell. The terminals include at least a first terminal and a second terminal. The first terminal is adapted to handle data having a super frame (SF) format. The second terminal is adapted to handle data having an extended super frame (ESF) format. A type of frame format of frame structure data to be sent to one of the terminals is distinguished by detecting a synchronization pattern of the frame structure data. The frame structure data is converted when the frame structure data is sent to the one of the terminals so that the converted frame structure data has a type of frame format corresponding to the detected synchronization pattern.

16 Claims, 10 Drawing Sheets

DATA COMMUNICATION METHOD FOR COMMUNICATING DATA HAVING DIFFERENT FRAME FORMATS AND FORMAT CONVERSION UNIT USED FOR SUCH A DATA COMMUNICATION METHOD

BACKGROUND OF THE INVENTION

1) Field of the Invention

The present invention generally relates to a data communication method and apparatus and, more particularly, to a data communication method which enables communications through an asynchronous transfer mode (ATM) network between terminals adapted to handle frame structure data having different frame formats, and to a format conversion unit which converts a type of frame format into another type of frame format.

Communications between terminals that transmit and receive data having different frame formats, can be performed through an ATM network by assembling the data into an ATM cell. In such a case, the terminals must be adapted to handle data having the same frame format. This is because if the terminals are adapted to handle different frame formats, respectively, a frame synchronization cannot be acquired.

2) Description of the Related Art

FIGS. 1A, 1B and 1C are illustrations of conventional network systems.

FIG. 1A shows a conventional DS1 network system in which terminals 61 to 64 are connected through a DS1 network 60. A transmission rate of the DS1 network 60 is 1.544 Mbps. Each of the terminals 61 to 64 is adapted to handle data having a frame format of a super frame (SF format). Since all of the terminals 61 to 64 are adapted to handle the super frame format data, communications between the terminals 61 to 64 can be freely performed through the DS1 network 60.

FIG. 1B shows a conventional DS1 network system in which terminals 71 to 74 are connected through a DS1 network 70. Each of the terminals 71 to 74 is adapted to handle data having a frame format of an extended super frame (ESF format). Since all of the terminals 71 to 74 are adapted to handle the extended super frame format data, communications between the terminals 71 to 74 can be freely performed through the DS1 network 70.

FIG. 1C shows an ATM network system in which terminals 91 to 96 are connected to an ATM network 90 via respective adaptor units 101 to 106 which assemble and disassemble ATM cells. Each of the adaptor units 101 to 106 divides frame format data into 48-byte data, adds a 5-byte header to each 48-byte data so as to assemble an ATM cell and sends the ATM cell to the ATM network 90. Each of the adaptor units 101 to 106 restores the frame format data from the ATM cell received via the ATM network 90 by removing the 5-byte header from the ATM cell. Accordingly, the ATM network 90 transmits the ATM cell.

In the ATM network system, there is a possibility that terminals adapted to handle a different format are connected to the ATM network as shown in FIG. 1C. That is, in FIG. 1C, unlike the network systems shown in FIGS. 1A and 1B, the terminals 91, 92, 94 and 96 are adapted to handle the super frame format data, and the terminals 93 and 95 are adapted to handle the extended super frame format data. In this case, the terminals adapted to handle the same frame format data can communicates with each other. The conventional ATM network 90 is established on the assumption that all of the terminals connected thereto are adapted to handle the same frame format data. Thus, no means is provided in the network 90 for inquiring about or detecting a type of frame format. Accordingly, when one of the DS1 terminals is connected to other DS1 terminals adapted to handle different frame format data through the ATM network 90, a normal communication cannot be performed due to failure of acquiring the frame synchronization. Even in such a case, a communication charge is incurred since the communication channel between the DS1 terminals is established.

SUMMARY OF THE INVENTION

It is a general object of the present invention to provide an improved and useful data communication method and a format conversion unit in which the above-mentioned problems are eliminated.

A more specific object of the present invention is to provide a data communication method which enables data communications between terminals adapted to handle frame structure data having different formats.

Another object of the present invention is to provide a format conversion unit which converts a type of frame format of frame structure data into another type of frame format in accordance with a result of detection of the type of frame format of the frame structure data transmitted through an ATM network.

In order to achieve the above-mentioned objects, there is provided according to one aspect of the present invention a data communication method between terminals connected via an asynchronous transfer mode (ATM) network in which frame structure data is transmitted in the form of an ATM cell, the terminals including at least a first terminal and a second terminal, the first terminal adapted to handle first frame structure data having a first frame format and the second terminal adapted to handle second frame structure data having a second frame format different from said first frame format, the method comprising the steps of:

a) distinguishing a type of frame format of the frame structure data to be sent to one of the terminals by detecting a synchronization pattern of the frame structure data; and b) converting the frame structure data when the frame structure data is sent to the one of the terminals so that the frame structure data has a type of frame format corresponding to the synchronization pattern detected in the step a).

According to the above-mentioned invention, the type of frame format of the frame structure data is converted into the one which can be handled by the terminal to which the frame structure data is sent. Thus, a communication can be performed between the terminals adapted to handle frame structure data having different frame formats.

The step b) may be performed when the frame structure data is assembled into the ATM cell, or when the ATM cell is disassembled into the frame structure data. Information representing the type of frame format distinguished in the step a) is sent from a local terminal to a remote terminal by adding the information to a message transmitted for establishing a communication channel through said ATM network. In one embodiment, the message is a call setup message transmitted from the local terminal to the remote terminal when the local terminal calls the remote terminal. In an alternative case, the information representing the type of frame format distinguished in the step a) is sent from the remote terminal to the local terminal by adding the information to a message transmitted for establishing a communication channel through said ATM network. The message is a response message transmitted from the remote terminal to the local terminal when the remote terminal receives a call setup message from the local terminal.

In one embodiment of the present invention, the terminals includes a terminal adapted to handle frame structure data having a super frame (SF) format and a terminal adapted to handle frame structure data having an extended super frame (ESF) format.

Additionally, there is provided according to another aspect of the present invention a format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by the synchronization pattern detecting unit; and a controlling unit controlling the conversion of the type of frame format in accordance with information regarding the type of frame format of the frame structure data.

According to the above-mentioned invention, since the type of frame format of the frame structure data is distinguished by the synchronization pattern detecting unit, the type of frame format can be converted into the one which can be handled by the terminal to which the frame structure data is sent. Thus, a communication can be performed between the terminals adapted to handle frame structure data having different frame formats.

The synchronization pattern detecting unit may detect the synchronization pattern of one of the frame structure data to be sent to said ATM network and the frame structure data received from a remote terminal through said ATM network. The synchronization pattern detecting unit may comprise a first detecting unit and a second detecting unit. The first detecting unit detects the synchronization pattern of the frame structure data to be sent to the ATM network. The second detecting unit detects the synchronization pattern of the frame structure data received from a remote terminal through the ATM network.

The information regarding the type of frame format is received from the synchronization pattern detecting unit. Thus the format conversion unit may further comprises an ATM cell producing unit producing a signaling ATM cell to which the information representing the type of frame format is added. In an alternative case, the information representing the type of frame format is received from a remote terminal through the ATM network. Thus, the format conversion unit may further comprise an ATM cell analyzing unit which derives the information representing the type of frame format from a signaling ATM cell received through the ATM network, and sends a notification of the type of frame format to the controlling unit.

In one embodiment, the format converting unit comprises a plurality of converting units and a selecting unit, each of the converting units performing a conversion for a respective type of frame format. The selecting unit selects one of outputs from the converting units in accordance with a control of the controlling unit based on the information representing the type of frame format.

Other objects, features and advantages of the present invention will become more apparent from the following detailed description when read in conjunction with the accompanying drawings.

DETAILED DESCRIPTION OF THE PREFERRED EMBODIMENT

Figure 2:
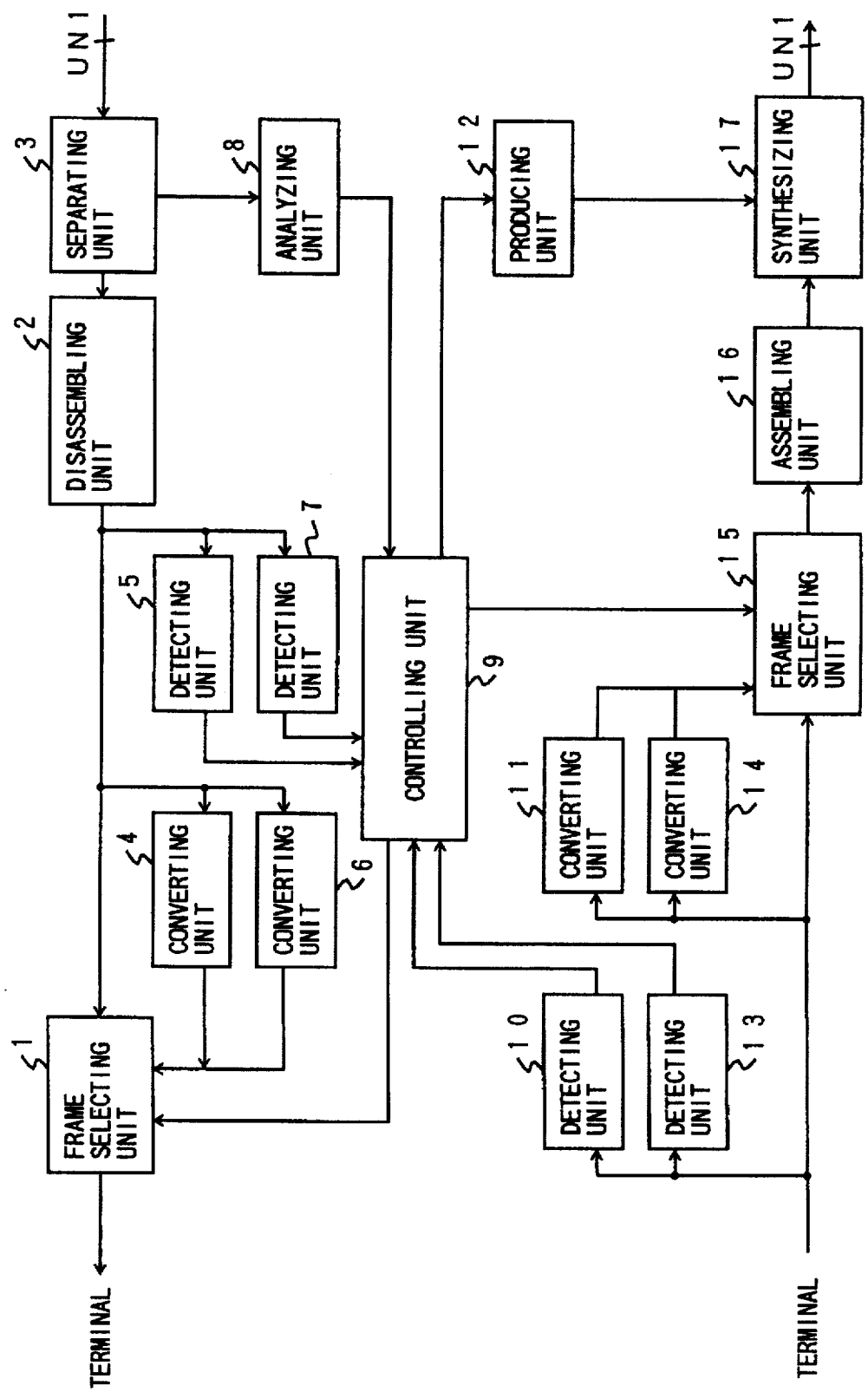
FIG. 2 is a block diagram of a frame conversion unit according to an embodiment of the present invention.

A description will now be given, with reference to FIG. 2, of an embodiment according to the present invention. FIG. 2 is a block diagram of a frame conversion unit according to the embodiment of the present invention.

Figure 1A:
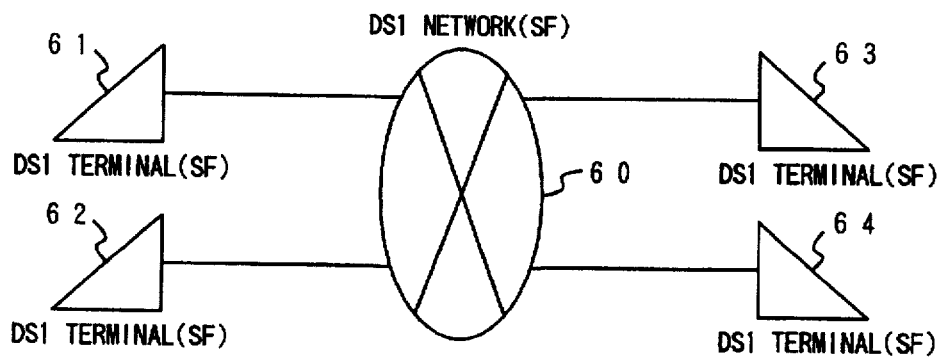
FIGS. 1A, 1B and 1C are illustrations of conventional network systems.
Figure 1B:
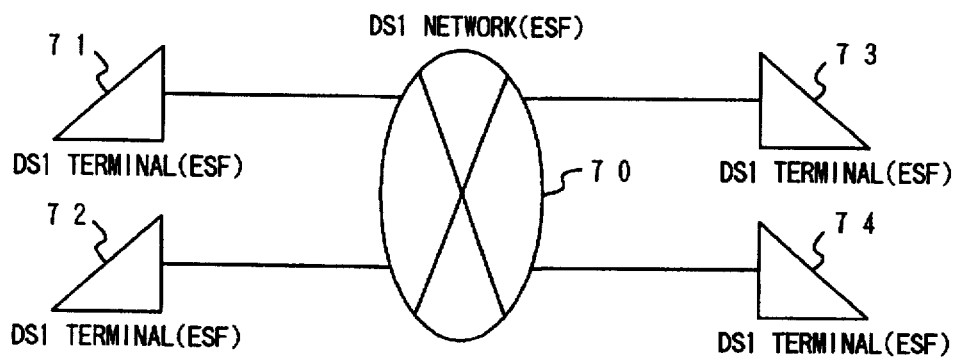
Figure 1C:
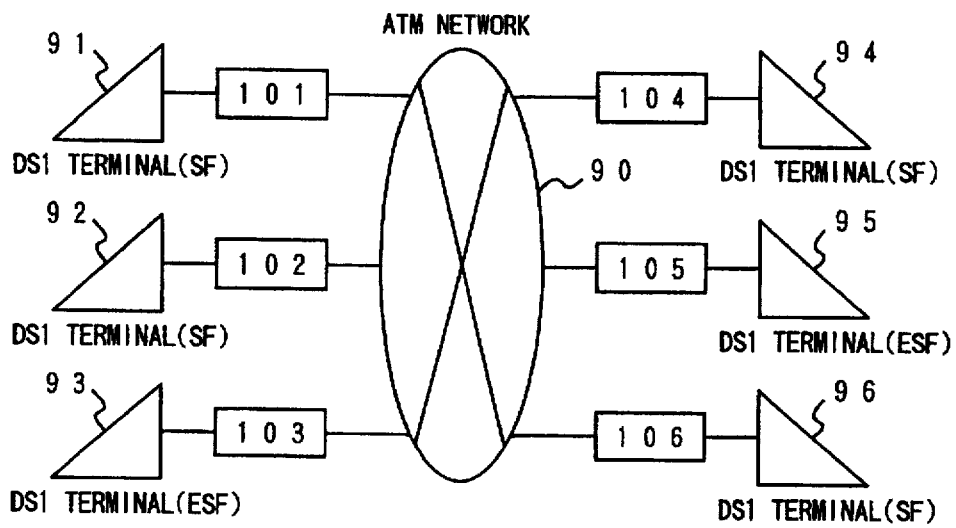

The frame conversion unit shown in FIG. 2 is incorporated into an adaptor unit provided between an ATM network and a terminal, similarly to the conventional network system shown in FIG. 1C. The frame conversion unit comprises a frame selecting unit 1, an ATM cell disassembling unit 2, an ATM cell separating unit 3, frame format converting units 4 and 6, frame format detecting units 5 and 7, an ATM cell analyzing unit 8, a controlling unit 9, frame format detecting units 10 and 13, frame format converting units 11 and 14, a signaling ATM cell producing unit 12, a frame selecting unit 15, an ATM cell assembling unit 16, and an ATM cell synthesizing unit 17.

The separating unit 3 separates the ATM cell, which is received from the ATM network via a user network interface UN1, into a signaling ATM cell and a non-signaling ATM cell. The signaling ATM cell is transferred to the analyzing unit 8, and the non-signaling ATM cell is transferred to the disassembling unit 2. The disassembling unit 2 disassembles the non-signaling ATM cell into a header and a data portion. The disassembling unit 2 combines the data portions of a plurality of ATM cells together so as to convert the data portions into data having a frame structure (frame structure data). The analyzing unit 8 analyzes the signaling ATM cell so as to derive information representing the type of frame format from the signaling ATM cell received through the ATM network. The analyzing unit 8 notifies the controlling unit 9 of the type of frame format.

The detecting units 5 and 7 distinguish the type of frame format (frame format type) by detecting a synchronization pattern of the frame structure data supplied by the disassembling unit 2. That is, the detecting units 5 and 7 are capable of distinguishing the type of frame format of data sent from a remote terminal.

The converting units 4 and 6 convert the synchronization pattern of the frame structure data supplied by the disassembling unit 2 into a synchronization pattern corresponding to the type of frame format of the data handled by the terminal to which the frame format data is supplied. The frame selecting unit 1 selects one of the frame structure data supplied by the disassembling unit 2 and the frame structure data supplied by the converting units 4 and 6 in accordance with control information supplied by the controller 9. The selected data is sent to a terminal (DS1 terminal) not shown in the figure. That is, the converting units 4 and 6 and the selecting unit 1 together serve to convert the type of frame format of the data sent from the remote terminal into the type of format of the data to be handled by the local terminal, if necessary, by adding the synchronization pattern designated by the frame format type information supplied by the controlling unit 9.

The detecting units 10 and 13 distinguish the type of frame format by detecting a synchronization pattern of the frame structure data sent from the local terminal. The frame format type information is transferred to the controlling unit 9. The converting units 11 and 14 convert the synchronization pattern of the frame format data into a synchronization pattern corresponding to the type of frame format of the data to be handled by the remote terminal. The frame selecting unit 15 selects one of the frame structure data sent from the local terminal and the frame structure data supplied by the converting units 11 and 14 in accordance with control information supplied by the controller 9. That is, the converting units 11 and 14 and the selecting unit 15 together serve to convert the type of frame format of the data sent from the local terminal into the type of format of the data to be handled by the remote terminal, if necessary, by adding the synchronization pattern designated by the frame format type information supplied by the controlling unit 9.

The assembling unit 16 assembles the selected frame structure data output from the frame selecting unit 15 into the non-signaling ATM cell. That is, the frame format data is divided into 48-byte data, and a header is added to each 48-byte data to assemble the ATM cell. The synthesizing unit 17 synthesizes the non-signaling ATM cell from the assembling unit 16 and the signaling ATM cell from the signaling ATM cell producing unit 12. The ATM cell producing unit 12 produces the signaling ATM cell having the information representing the type of frame format. The synthesized ATM cell is sent to the ATM network via the user network interface UN1.

It should be noted that the detecting units 5, 7, 10 and 13 together constitute a synchronization pattern detecting unit which detects a synchronization pattern of frame structure data transmitted through said ATM network so as to distinguish a type of frame format of the frame structure data. Additionally, the converting units 4, 6, 11 and 14 together constitute a format converting unit which converts the frame format of the frame structure data in response to the type of the frame format distinguished by the synchronization pattern detecting unit.

Figure 3:
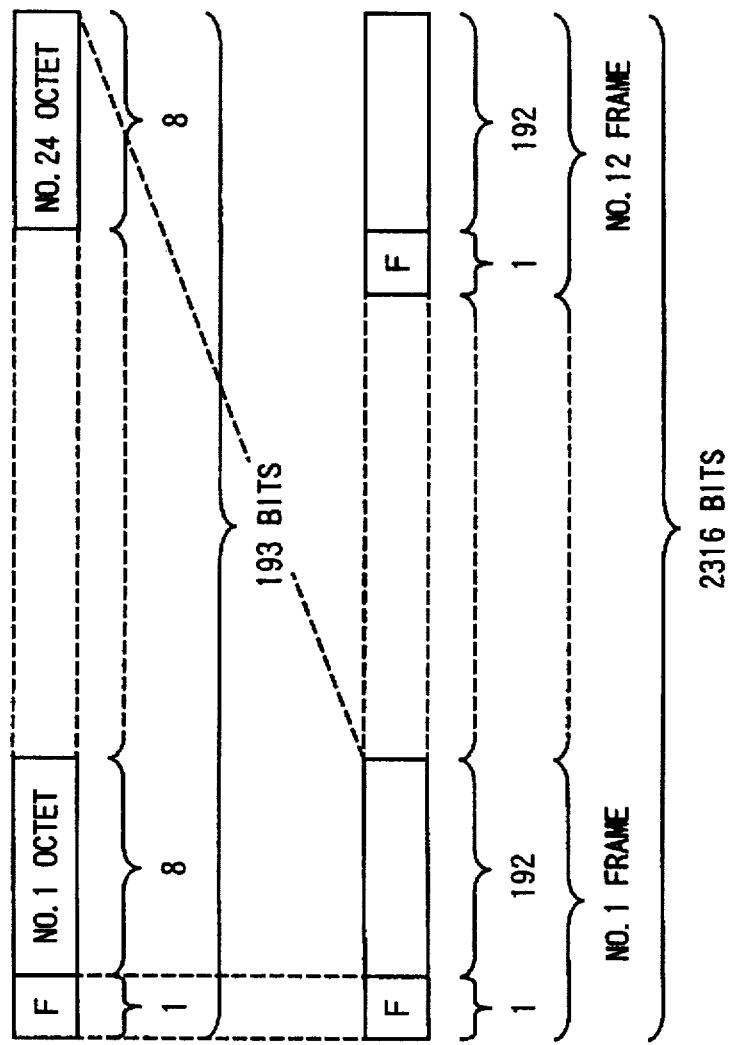
FIG. 3 is an illustration for explaining a frame format of a super frame.

FIG. 3 is an illustration for explaining the frame format of the super frame FS. The super frame SF is comprised of twelve frames, that is, NO.1 frame to No. 12 frame. Each of the frames includes twenty four octets, from No. 1 octet to No. 24 octet. Additionally, a synchronization bit F consisting of a single bit is added to a head of the No. 1 octet. Accordingly, each of the frames consists of 193 bits, and, thus, the super frame SF consists of 2,316 bits. The bit pattern $F_t$ of the synchronization bits of the odd number frames and the bit pattern $F_s$ of the synchronization bits of the even number frames are defined in the table shown in FIG. 3. Apparent from the table of FIG. 3, the synchronization bit pattern of the super frame SF is "100011011100".

Figure 4:
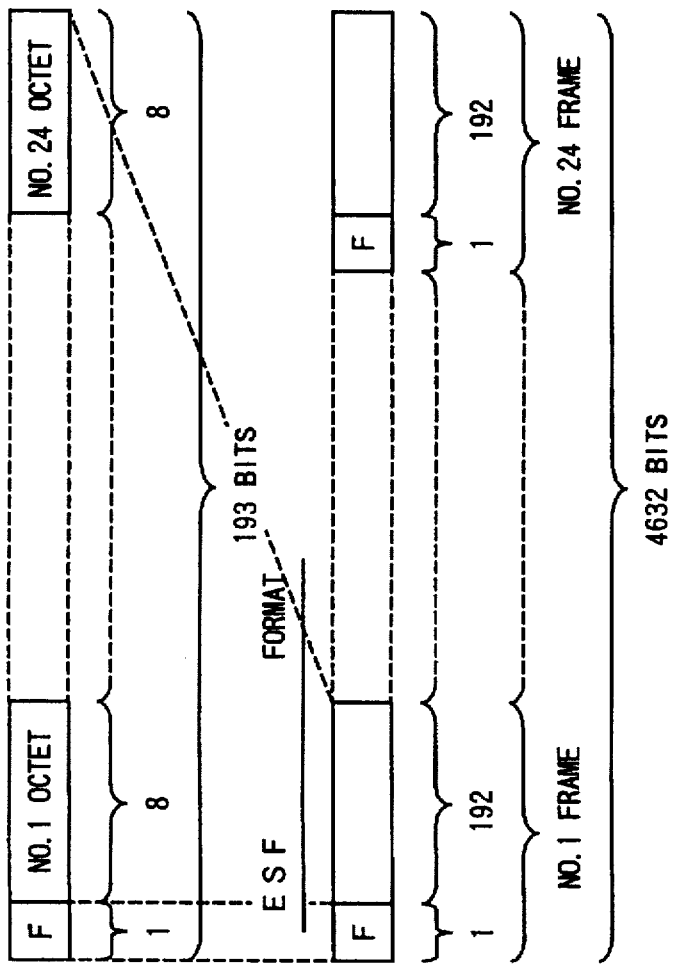
FIG. 4 is an illustration for explaining a frame format of an extended super frame.

FIG. 4 is an illustration for explaining the frame format of the extended super frame EFS. The super frame ESF is comprised of twenty-four frames, that is, No. 1 frame to No. 24 frame. Similarly to the super frame SF, each of the frames includes twenty four octets, from No. 1 octet to No. 24 octet. Additionally, a synchronization bit F consisting of a single bit is added to a head of the No. 1 octet. Accordingly, each of the frames consists of 193 bits, and, thus, the extended super frame ESF consists of 4,362 bits. The bit pattern of the synchronization bits F of the twenty-four frames is defined as shown in the table in FIG. 4. The bit pattern FPS includes the synchronization bits of the frames of Nos.4, 8, 12, 16, 20 and 24. The bit pattern FPS corresponds to the synchronization bit pattern, and is set to the bit pattern "001011". The synchronization bits of the frames of Nos.2, 6, 10, 14, 18 and 22 are used as cyclic redundancy check (CRC) bits C1 to C6 for the previous frame. The synchronization bits (DL) of the odd number frames, that is, the frames of Nos. 1, 3, 5, 7, 9, 11, 13, 15, 17, 19, 21 and 23, are used for representing alarm information.

It should be noted that, in the present embodiment, the detecting units 5, 7, 10 and 13 shown in FIG. 2 are provided for detecting the types of frame format of the super frame SF and the extended super frame ESF.

Figure 5:
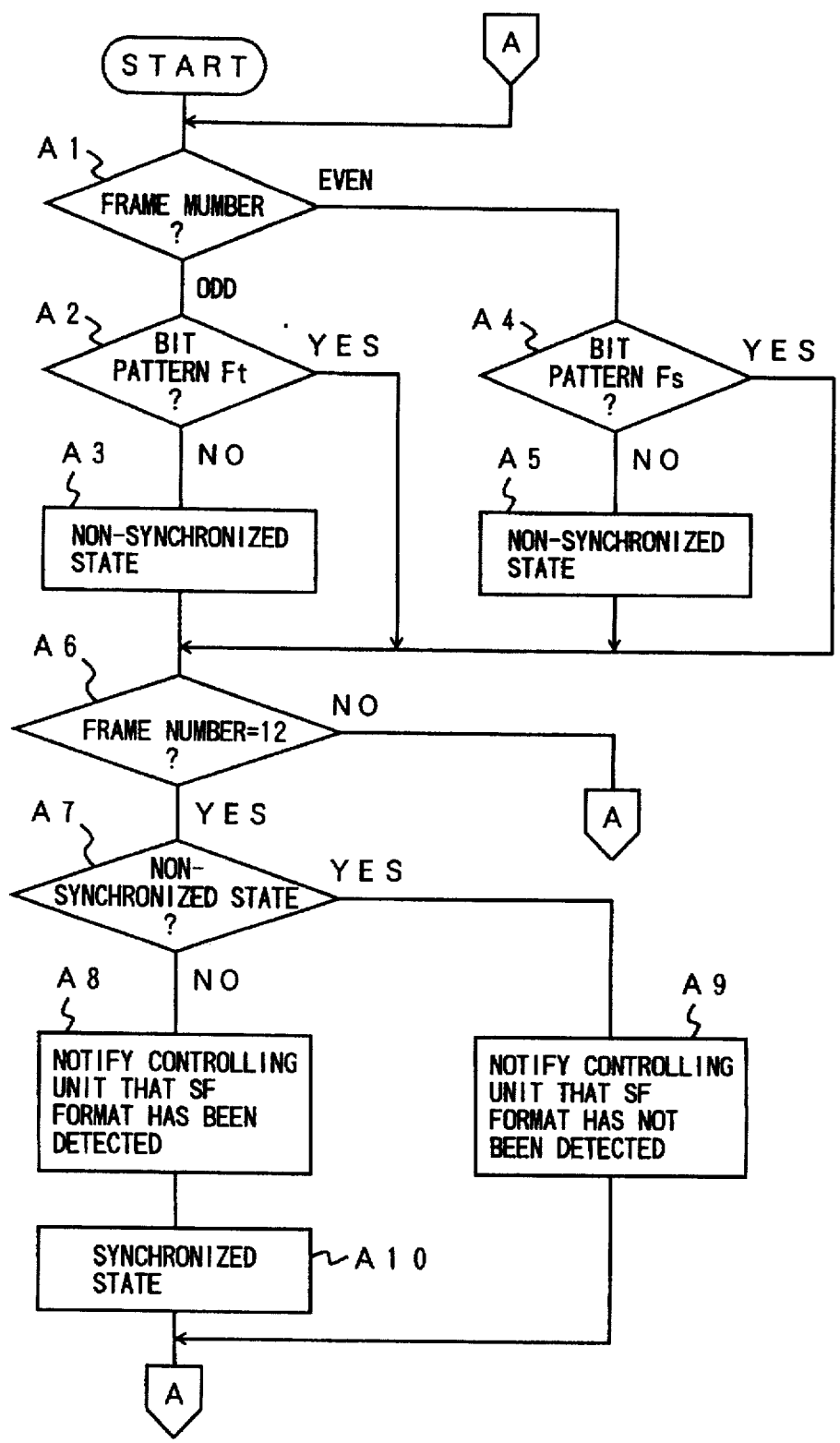
FIG. 5 is a flowchart of an operation for detecting the frame format of the super frame.

FIG. 5 is a flowchart of an operation for detecting the frame format of the super frame. In step A1, it is determined whether the frame number is an odd number or an even number. If the frame number is an odd number, the routine proceeds to step A2. In step A2, it is determined whether the synchronization pattern corresponds to the odd number frame bit pattern $F_t$ shown in FIG. 3. If the synchronization pattern does not correspond to the odd number frame bit pattern $F_t$, it is determined in step A3 that the synchronization is not acquired (non-synchronized state). If it is determined, in step A1, that the frame number is an even number, the routine proceeds to step A4. In step A4, it is determined whether the synchronization pattern corresponds to the even number frame bit pattern $F_s$ shown in FIG. 3. If the synchronization pattern does not correspond to the even number frame bit pattern $F_s$, it is determined in step A5 that the synchronization is not acquired (non-synchronized state).

If the synchronization pattern corresponds to one of the odd number frame bit pattern $F_t$ and the even number frame bit pattern $F_s$, the routine proceeds to step A6. In step A6, it is determined whether or not the frame number is equal to 12. That is, it is determined whether or not a checking of the synchronization pattern for all of the frames included in a single super frame format ATM cell is completed. If the frame number is not equal to 12, the routine returns to step A1 to repeat the same steps for the next frame. If it is determined that the frame number is equal to 12, the routine proceeds to step A7. In step A7, it is determined whether or not the operation is in the non-synchronized state. If the operation is not in the non-synchronized state, the routine proceeds to step A8 to notify the controlling unit 9 that the super frame (SF) format has been detected. It is determined, in step A10, that the operation is in the synchronized state. If it is determined, in step A7, that the operation is in the non-synchronized state, the routine proceeds to step A9 to notify the controlling unit 9 that the super frame (SF) format has not been detected.

Figure 6:
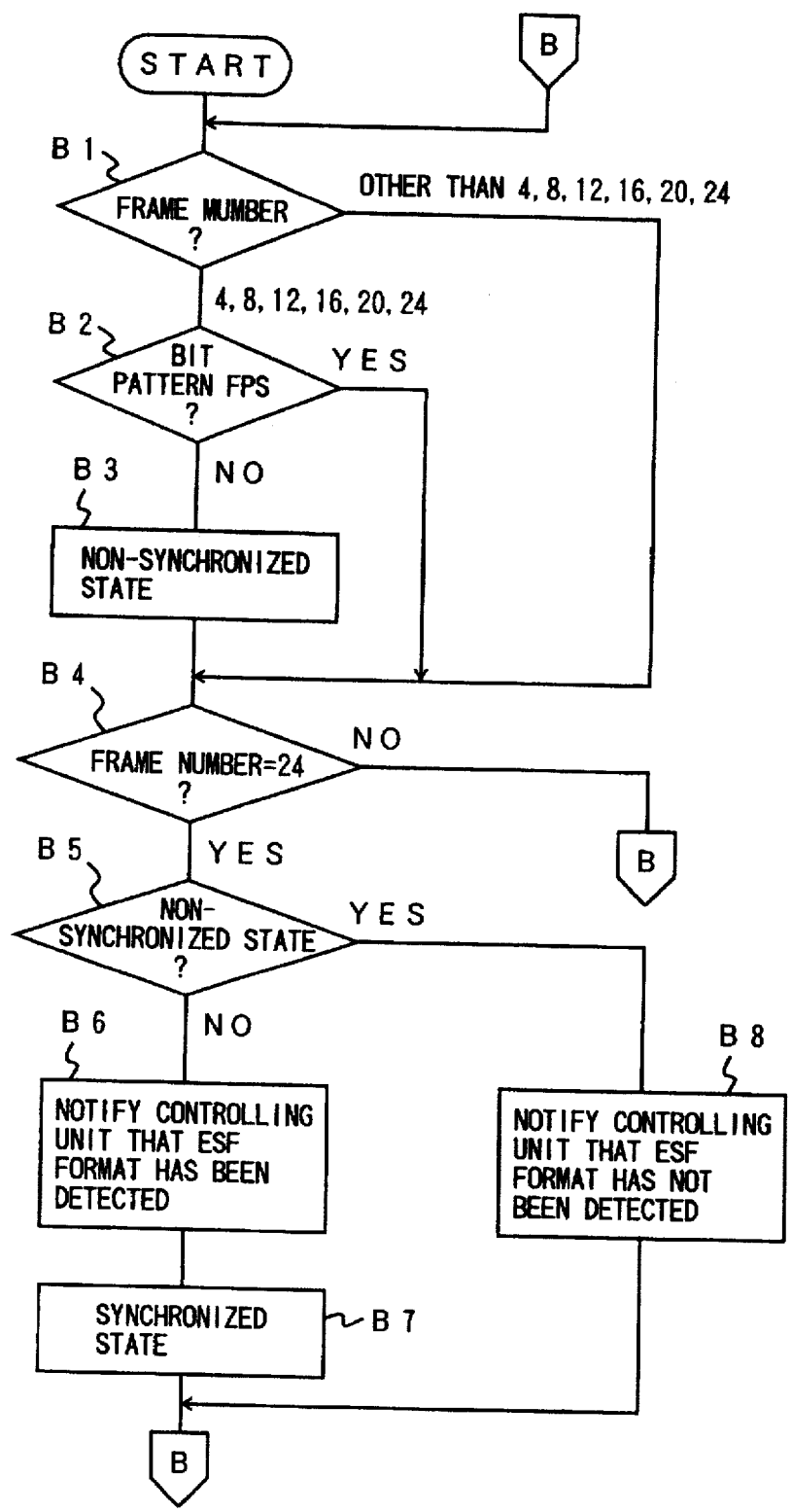
FIG. 6 is a flowchart of an operation for detecting the frame format of the extended super frame.

FIG. 6 is a flowchart of an operation for detecting the frame format of the extended super frame. In step B1, it is determined whether the frame number is equal to one of the numbers 4, 8, 12, 16, 20 and 24. If the frame number is one of those numbers, the routine proceeds to step B2. In step B2, it is determined whether the synchronization pattern corresponds to the bit pattern FPS shown in FIG. 4. If the synchronization pattern does not correspond to the bit pattern FPS, it is determined, in step B3, that the synchronization is not acquired (non-synchronized state), and then the routine proceeds to step B4.

On the other hand, if the frame number is not equal to one of the above-mentioned numbers, or if the synchronization pattern does not correspond to the bit pattern FPS, the routine directly proceeds to step B4.

In step B4, it is determined whether or not the number of the frame is equal to 24. That is, it is determined whether or not a checking of the synchronization pattern for all of the frames included in a single extended super frame format ATM cell is completed. If the frame number is not equal to 24, the routine returns to step B1 to repeat the same steps for the next frame. If it is determined that the frame number is equal to 24, the routine proceeds to step B5. In step B5, it is determined whether or not the operation is in the non-synchronized state. If the operation is not in the non-synchronized state, the routine proceeds to step B6 to notify the controlling unit 9 that the extended super frame (ESF) format has been detected. It is then determined, in step B7, that the operation is in the synchronized state. If it is determined, in step B5, that the operation is in the non-synchronized state, the routine proceeds to step B8 to notify the controlling unit 9 that the extended super frame (ESF) format has not been detected.

In the present embodiment, the detecting units 5 and 10 shown in FIG. 2 perform the operation for detecting the SF format. The detecting units 7 and 13 perform the operation for detecting the ESF format. That is, in the present embodiment, the detecting units are provided for detecting the respective type of frame format. It should be noted that when only two types of frame format should be distinguished, the detecting unit, which detects either one of the two types of frame format, is sufficient for distinguishing the type of frame format.

Figure 7:
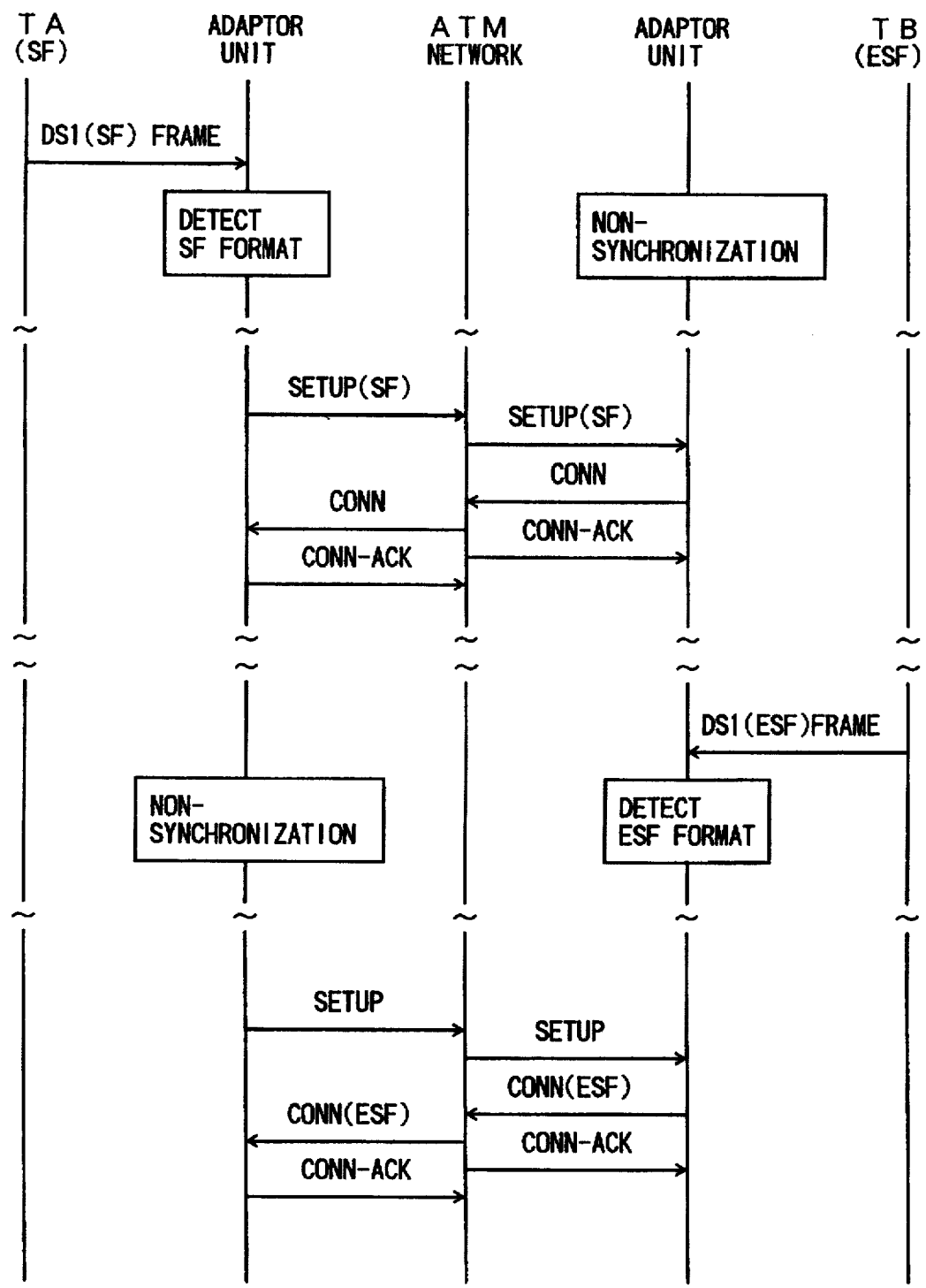
FIG. 7 is an illustration for explaining a sequence of the operation for sending a notification of the type of frame format.

FIG. 7 is an illustration for explaining a sequence of the operation for sending a notification of the type of frame format. It is assumed that a terminal TA and a terminal TB are connected by an ATM network via respective adaptor units having the frame conversion unit shown in FIG. 2. The terminal TA is adapted to handle the SF format data, and the terminal TB is adapted to handle the ESF format data. It is assumed that the terminal TA is a sender and the terminal TB is a receiver. When the adaptor unit of the sending terminal TA sends a notification of the type of frame format to the adaptor unit of the receiving terminal TB, the adaptor unit of the terminal TA first detects the SF format data of DS1 (1.544 Mbps). The result of detection is sent to the controlling unit 9 provided in the adaptor unit of the sending terminal TA. The frame format type information is then added to a call setup message SETUP when it is sent to the terminal TB.

When the adaptor unit of the receiving terminal TB receives the call setup message SETUP, the type of frame format of the data to be sent from the sending terminal TA is distinguished by the frame format type information added to the call setup message SETUP. Thereafter, the adaptor unit of the receiving terminal TB sends a response message CONN to the ATM network. Then, the ATM network sends a response acknowledge message CONN-ACK to the adaptor unit of the receiving terminal TB. At the same time, the ATM network sends the response message CONN to the adaptor unit of the sending terminal TA. Then, the adaptor unit of the sending terminal TA sends a response acknowledge message CONN-ACK to the ATM network. In this manner, the sending terminal TA (sender) and the receiving terminal TB (receiver) are connected through the ATM network. In this case, a format converting operation is performed in the adaptor unit of the receiver, that is, the receiving terminal TB.

After, the receiving terminal TB receives the frame format type information by the call setup message SETUP, the ATM cells sent from the sending terminal TA are converted into the frame format data by the disassembling unit 2. Then, the frame format data is converted into the ESF format data, which can be handled by the receiving terminal TB, by the converting unit 6. On the other hand, the data to be sent from the terminal TB to the terminal TA is converted into the SF format data by the converting unit 14. The SF format data is assembled into the ATM cell by the assembling unit 16, and sent to the ATM network via the synthesizing unit 17. In this case, the adaptor unit of the sending terminal TA performs an operation similar to the operation performed by a terminal which communicates the SF format data.

In an alternative case in which a notification of the type of frame format is sent from the receiver, the adaptor unit of the receiving terminal TB detects the ESF frame format from the frame format data of the receiving terminal TB. The result of detection is sent to the controlling unit 9 provided in the adaptor unit of the receiving terminal TB. A call setup message SETUP is sent to the ATM network when the sending terminal TA sends the call setup. Then, the call setup message SETUP is sent to the ATM network, and thus the call setup message is sent to the adaptor unit of the receiving terminal TB from the ATM network. The adaptor unit of the receiving terminal TB sends a response message CONN to the ATM network by adding the frame format type information, which indicates the ESF frame format, to the response message CONN. The ATM network then sends the response message CONN including the frame format type information to the adaptor unit of the sending terminal TA. At this time the response acknowledge message CONN-ACK is sent from the ATM network to the adaptor unit of the receiving terminal TB and from the adaptor unit of the sending terminal TA to the ATM network. In this case, the format converting operation is performed in the adaptor unit of the sending terminal TA. That is, the adaptor unit of the sending terminal TA sends the frame format data of the terminal TA to the ATM network after converting the frame format data into the ESF format data by the converting unit 11. The ATM cells received from the receiving terminal TB are converted into the frame format data by the assembling unit 2 of the adaptor unit of the sending terminal TA. The frame format data is then converted into the SF format data and sent to the sending terminal TA. Accordingly, the adaptor unit of the receiving terminal TB performs an operation similar to the operation performed by a terminal which communicates the ESF format data.

Figure 8:
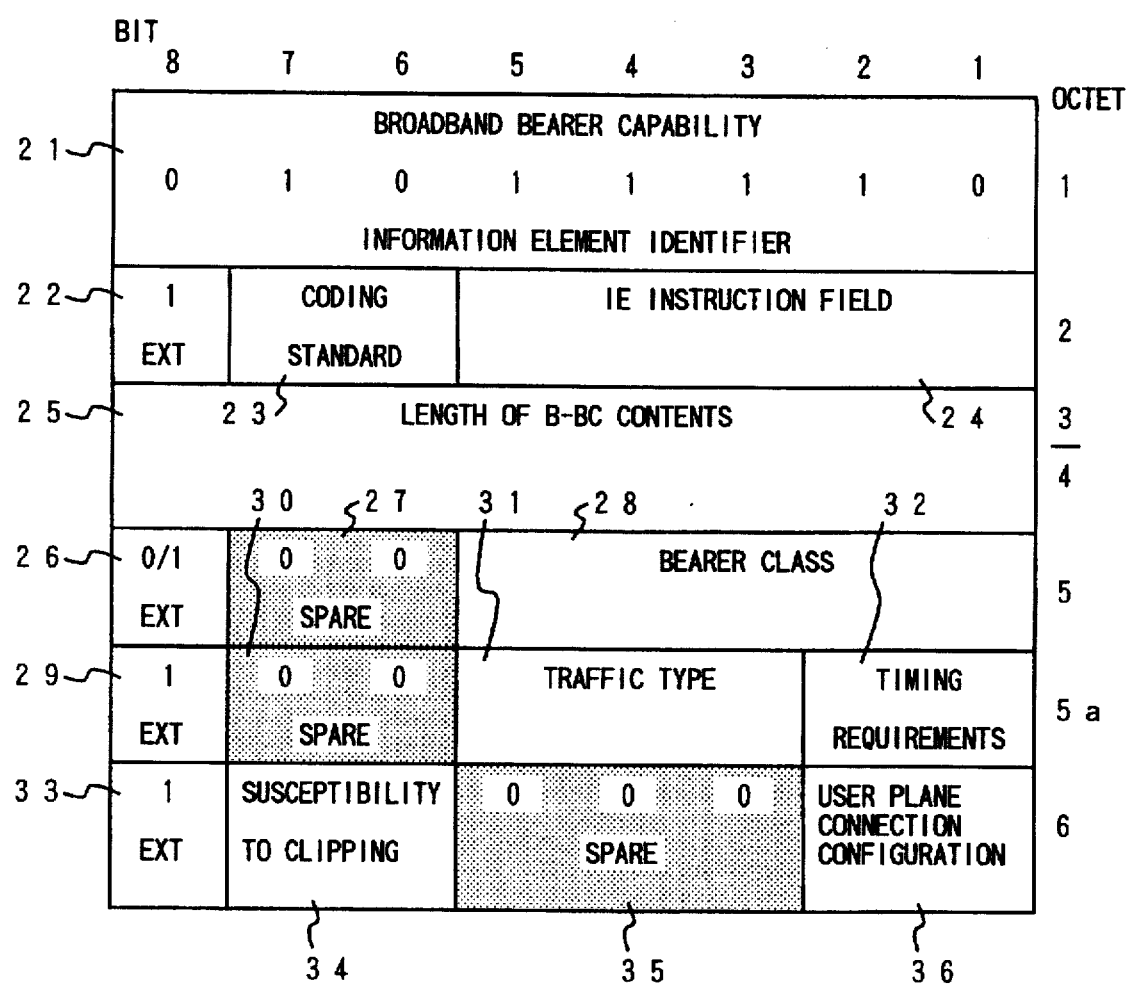
FIG. 8 is an illustration for explaining a frame format of a call setup message to which frame format type information is added.

FIG. 8 is an illustration for explaining a frame format of the call setup message to which the frame format type information is added. This format is in accordance with the ITU-T.Q.2931. In FIG. 8, No. 1 octet is a field 21 for an information element identifier of a broadband bearer capacity. No. 2 octet includes an extension bit 22, a coding standard field 23 and an IE instruction field 24. No. 3 and No. 4 octets are a field 25 for a length of the B-BC contents. No. 5 octet includes an extension bit 26, spare bits 27 and a bearer class field 28. No. 5a octet is provided when the bearer class is set to X ("10000"). No. 5a octet includes an extension bit 29, spare bits 30, a traffic type field 31 and a timing requirements field 32. No. 6 octet includes an extension bit 33, a field 34 for representing a susceptibility to clipping, spare bits 35 and a user plane connection configuration field 36 which represents a point-to-point connection or a point-to-multipoints connection. In this format, the spare bits 27, 30 or 35 can be assigned for representing the frame format type information.

Figure 9:
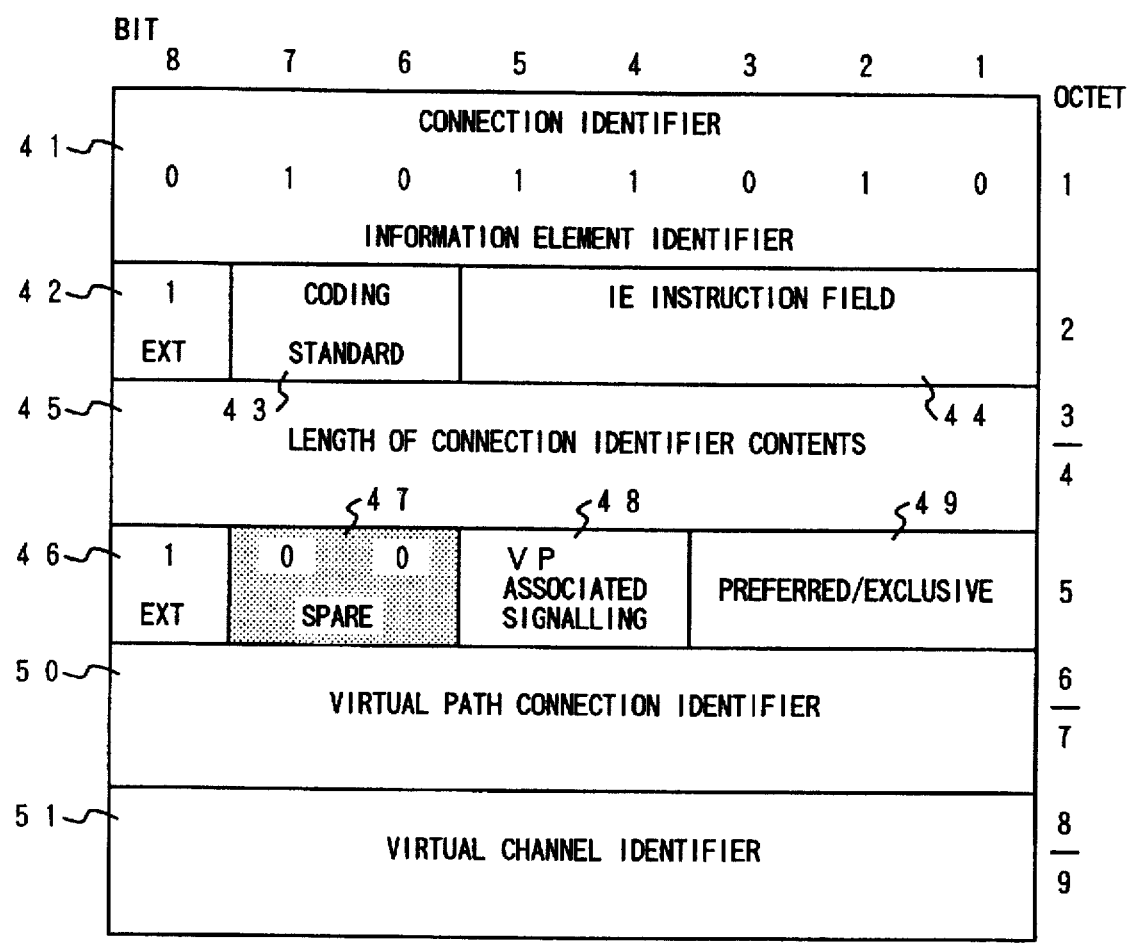
FIG. 9 is an illustration for explaining a frame format of a response message to which frame format type information is added.

FIG. 9 is an illustration for explaining a frame format of the response message to which the frame format type information is added. This format is in accordance with the ITU-T.Q.2931. In FIG. 9, No. 1 octet is a field 41 for an information element identifier of a connection identifier. No. 2 octet includes an extension bit 42, a coding standard field 43 and an IE instruction field 44. No. 3 and No. 4 octets are a field 45 for a length of connection identifier contents. No. 5 octet includes an extension bit 46, spare bits 47, a field 48 for VP associated signaling and a field 49 for preferred/exclusive. No. 6 and No. 7 octets are a field 50 for a virtual path connection identifier. No. 8 and No. 9 octets are for a virtual channel identifier. In this format, the spare bits 47 can be assigned for representing the frame format type information.

Figure 10:
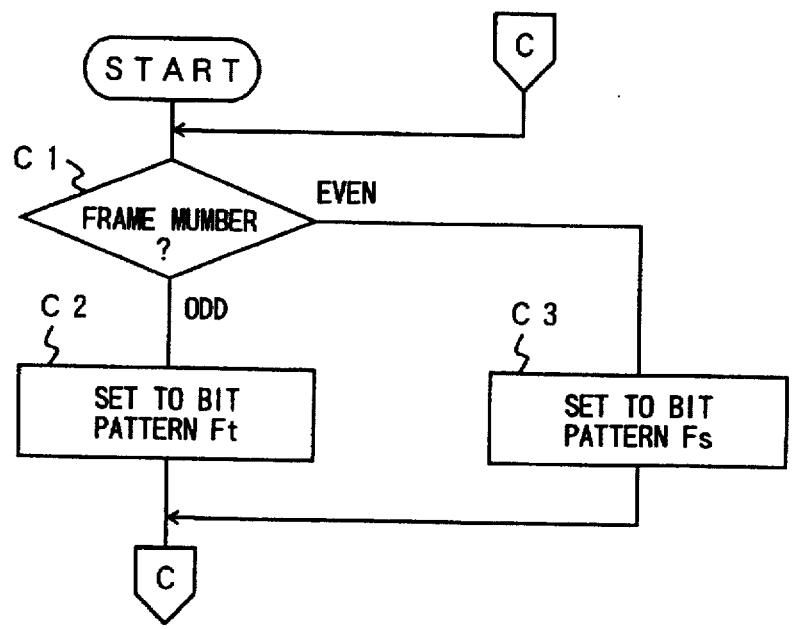
FIG. 10 is a flowchart of an operation for converting frame format data into the SF format data.

FIG. 10 is a flowchart of an operation for converting the frame format data into the SF format data. When the operation is started, it is determined, in step C1, whether the frame number is an odd number or an even number. If the frame number is an odd number, the synchronization bit F of the frame is set, in step C2, to be equal to the corresponding bit in the bit pattern $F_s$ shown in FIG. 4. If the frame number is an even number, the synchronization bit F of the frame is set, in step C3, to be equal to the corresponding bit in the bit pattern $F_s$ shown in FIG. 4. In this way, the ESF format data can be converted into the SF format data.

Figure 11:
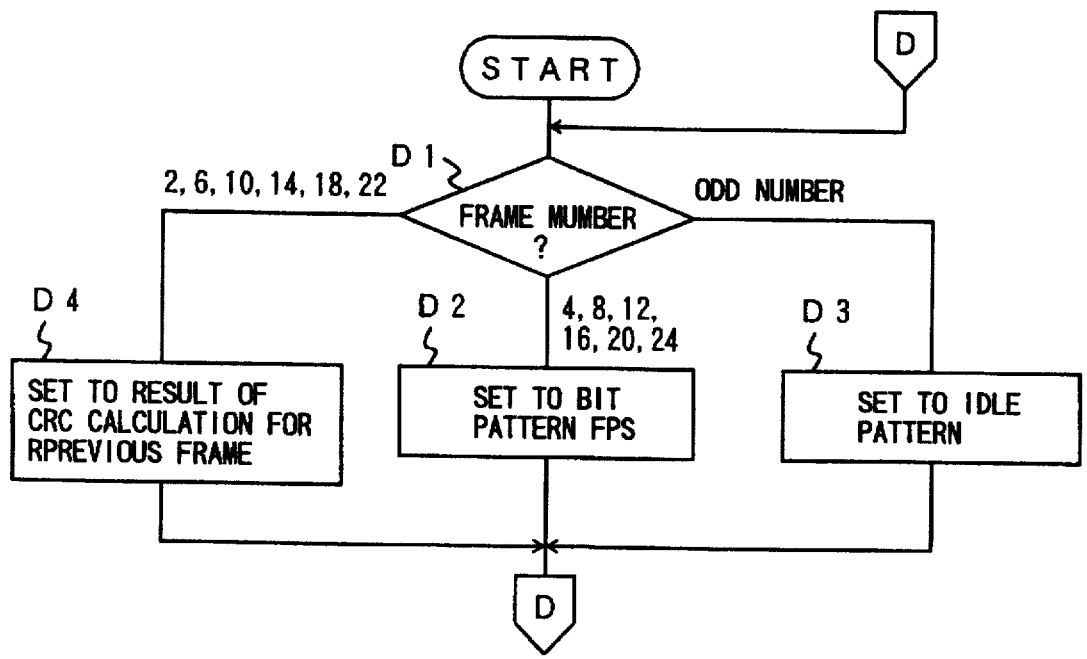
FIG. 11 is a flowchart of an operation for converting frame format data into the ESF format data.

FIG. 11 is a flowchart of an operation for converting the frame format data into the ESF format data. When the operation is started, it is determined, in step D1, whether the frame number is equal to one of the numbers 4, 8, 12, 16, 20 and 24, an odd number or one of the numbers 2, 6, 10, 14, 18 and 22. If the frame number is equal to one of the numbers 4, 8, 12, 16, 20 and 24, the synchronization bit F of the frame is set, in step D2, to be equal to the corresponding bit of the bit pattern FPS shown in FIG. 5. If the frame number is an odd number, the synchronization bit F of the frame is set, in step D3, to be equal to the corresponding bit of the idle pattern "01111110". If the frame number is equal to one of the numbers 2, 6, 10, 14, 18 and 22, the synchronization bit F of the frame is set, in step D4, to be equal to the result of calculation of the cyclic redundancy check bit (CRC) for the previous frame. In this way, the SF format data can be converted into the ESF format data.

It should be noted that the present invention can be applied for the type of frame format other than the SF format or the ESF format. Additionally, the conversion of the format may be performed, without sending a notification of the type of frame format for each call setup, by storing terminal number information and the corresponding frame format type information in the format converting unit of the adapter unit. In this case, the notification of the type of frame format is sent by using the signaling ATM cell for the call setup message or the response message. Additionally, the present invention may be applied to the DS3 network (transmission rate 44.736 Mbps) or the switched multimegabits data service (SMDS).

The present invention is not limited to the specifically disclosed embodiments, and variations and modifications may be made without departing from the scope of the present invention.

What is claimed is:

1. A data communication method between terminals connected via an asynchronous transfer mode (ATM) network in which frame structure data is transmitted in the force of an ATM cell, said terminals including at least a first terminal and a second terminal, said first terminal adapted to handle first frame structure data having a first frame format and said second terminal adapted to handle second frame structure data having a second frame format different from said first frame format, the method comprising the steps of:

a) distinguishing a type of frame format of the frame structure data to be sent to one of said terminals by detecting a synchronization pattern of the frame structure data;

b) converting the frame structure data when the frame structure data is sent to said one of said terminals so that the converted frame structure data has a type of frame format corresponding to the synchronization pattern detected in the step a); and wherein the step b) is performed when the frame structure data is assembled into the ATM cell.

2. A data communication method between terminals connected via an asynchronous transfer mode (ATM) network in which frame structure data is transmitted in the form of an ATM cell, said terminals including at least a first terminal and a second terminal, said first terminal adapted to handle first frame structure data having a first frame format and said second terminal adapted to handle second frame structure data having a second frame format different from said first frame format, the method comprising the steps of:

a) distinguishing a type of frame format of the frame structure data to be sent to one of said terminals by detecting a synchronization pattern of the frame structure data;

b) converting the frame structure data when the frame structure data is sent to said one of said terminals so that the converted frame structure data has a type of frame format corresponding to the synchronization pattern detected in the step a); and wherein the step b) is performed when the ATM cell is disassembled into the frame structure data.

3. A data communication method between terminals connected via an asynchronous transfer mode (ATM) network in which frame structure data is transmitted in the form of an ATM cell, said terminals including at least a first terminal and a second terminal, said first terminal adapted to handle first frame structure data having a first frame format and said second terminal adapted to handle second frame structure data having a second frame format different from said first frame format, the method comprising the steps of:

a) distinguishing a type of frame format of the frame structure data to be sent to one of said terminals by detecting a synchronization pattern of the frame structure data;

b) converting the frame structure data when the frame structure data is sent to said one of said terminals so that the converted frame structure data has a type of frame format corresponding to the synchronization pattern detected in the step a); and wherein information representing the type of frame format distinguished in the step a) is sent from a local terminal to a remote terminal by adding said information to a message transmitted for establishing a communication channel through said ATM network.

4. The data communication method as claimed in claim 3, wherein said message is a call setup message transmitted from the local terminal to the remote terminal when the local terminal calls the remote terminal.

5. A data communication method between terminals connected via an asynchronous transfer mode (ATM) network in which frame structure data is transmitted in the form of an ATM cell, said terminals including at least a first terminal and a second terminal, said first terminal adapted to handle first frame structure data having a first frame format and said second terminal adapted to handle second frame structure data having a second frame format different from said first frame format, the method comprising the steps of:

a) distinguishing a type of frame format of the frame structure data to be sent to one of said terminals by detecting a synchronization pattern of the frame structure data;

b) converting the frame structure data when the frame structure data is sent to said one of said terminals so that the converted frame structure data has a type of frame format corresponding to the synchronization pattern detected in the step a); and wherein information representing the type of frame format distinguished in the step a) is sent from a remote terminal to a local terminal by adding said information to a message transmitted for establishing a communication channel through said ATM network.

6. The data communication method as claimed in claim 5, wherein said message is a response message transmitted from the remote terminal to the local terminal when the remote terminal receives a call setup message from the local terminal.

7. A data communication method between terminals connected via an asynchronous transfer mode (ATM) network in which frame structure data is transmitted in the form of an ATM cell, said terminals including at least a first terminal and a second terminal, said first terminal adapted to handle first frame structure data having a first frame format and said second terminal adapted to handle second frame structure data having a second frame format different from said first frame format, the method comprising the steps of:

a) distinguishing a type of frame format of the frame structure data to be sent to one of said terminals by detecting a synchronization pattern of the frame structure data;

b) converting the frame structure data when the frame structure data is sent to said one of said terminals so that the converted frame structure data has a type of frame format corresponding to the synchronization pattern detected in the step a); and wherein said first frame is a super frame (SF) format and said second frame format is an extended super frame (ESF) format.

8. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said synchronization pattern detecting unit detects the synchronization pattern of one of the frame structure data to be sent to said ATM network and the frame structure data received from a remote terminal through said ATM network.

9. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said synchronization pattern detecting unit comprises a first detecting unit and a second detecting unit, said first detecting unit detecting the synchronization pattern of the frame structure data to be sent to said ATM network, said second detecting unit detecting the synchronization pattern of the frame structure data received from a remote terminal through said ATM network.

10. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said information representing the type of frame format is received from said synchronization pattern detecting unit.

11. The format conversion unit as claimed in claim 10, further comprising an ATM cell producing unit producing a signaling ATM cell to which said information representing the type of frame format is added.

12. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said information regarding the type of frame format is received from a remote terminal through said ATM network.

13. The format conversion unit as claimed in claim 12, further comprising an ATM cell analyzing unit which derives said information representing the type of frame format from a signaling ATM cell received through said ATM network, and sends a notification of the type of frame format to said controlling unit.

14. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said format converting unit comprises a plurality of converting units and a selecting unit, each of said converting units performing a conversion for a respective type of frame format, said selecting unit selecting one of outputs from said converting units in accordance with a control of said controlling unit based on said information representing the type of frame format.

15. A format conversion unit for an adaptor unit used for connecting an asynchronous transfer mode (ATM) network to one of terminals, comprising:

a synchronization pattern detecting unit detecting a synchronization pattern of frame structure data transmitted through said ATM network so as to distinguish a type of frame format of the frame structure data;

a format converting unit converting the frame format of the frame structure data in response to the type of the frame format distinguished by said synchronization pattern detecting unit;

a controlling unit controlling a conversion of the type of frame format in accordance with information representing the type of frame format of the frame structure data; and wherein said terminals includes at least a first terminal and a second terminal, said first terminal adapted to handle first frame structure data having a first frame format, said second terminal adapted to handle second frame structure data having a second frame format.

16. The format conversion unit as claimed in claim 15, wherein said first frame format is a super frame (SF) format and said second frame format is an extended super frame (ESF) format.

* * * * *